United States Patent [19]

Kitagawa et al.

[11] Patent Number: 5,629,371

[45] Date of Patent: May 13, 1997

[54] RESIN MOLDING

[75] Inventors: Sadao Kitagawa; Yuta Kumano, both of Yokkaichi, Japan

[73] Assignee: Mitsubishi Petrochemical Co., Ltd., Tokyo, Japan

[21] Appl. No.: 137,970

[22] Filed: Oct. 19, 1993

Related U.S. Application Data

[60] Division of Ser. No. 828,460, Jan. 31, 1992, Pat. No. 5,276,093, which is a continuation-in-part of Ser. No. 612,488, Nov. 14, 1990, Pat. No. 5,196,270.

[30] Foreign Application Priority Data

| Nov. 14, 1989 | [JP] | Japan | 1-295746 |
| Mar. 27, 1990 | [JP] | Japan | 2-077450 |
| Mar. 27, 1990 | [JP] | Japan | 2-077451 |

[51] Int. Cl.$^6$ .................................................. C08L 53/00
[52] U.S. Cl. ................... 524/505; 524/449; 524/451; 524/493; 524/496; 524/525; 525/89; 525/88; 525/98; 525/240; 428/323; 428/324; 428/297.4
[58] Field of Search ................. 525/89, 88, 98, 525/240, 194; 524/505, 449, 525; 428/523, 297, 324, 500

[56] References Cited

U.S. PATENT DOCUMENTS

| 3,627,856 | 12/1971 | Thienot | 525/194 |
| 4,211,690 | 7/1980 | Asano et al. | 525/88 |
| 4,687,804 | 8/1987 | Shiraishi et al. | 524/505 |
| 4,707,514 | 11/1987 | Katsuki et al. | 524/505 |
| 4,748,206 | 5/1988 | Nogiwa et al. | 525/88 |
| 4,764,546 | 8/1988 | Mitsuno et al. | 523/213 |
| 4,786,675 | 11/1988 | Iwata et al. | 523/456 |
| 4,822,855 | 4/1989 | Kobayashi et al. | 525/194 |
| 4,843,125 | 6/1989 | Kawamura et al. | 525/98 |
| 4,987,173 | 1/1991 | Nomura et al. | 524/423 |
| 5,036,118 | 7/1991 | Martinez | 523/212 |

FOREIGN PATENT DOCUMENTS

| 0311723 | 4/1989 | European Pat. Off. . |
| 8604912 | 8/1986 | WIPO . |
| 8807564 | 10/1988 | WIPO . |

OTHER PUBLICATIONS

Encyclopedia of Polymer Science and Engineering, vol. 2, "Carbon Black", pp. 623–627.

Database WPIL, accession No. 82–14377E (08), Derwent Publications Ltd., London, GB; 12 Jan. 1982 (Abstract of Japan 57–005735).

Database WPIL, accession No. 88–365202 (51), Derwent Publications Ltd., London, GB; 14 Nov. 1988 (Abstract of Japan 63–275656).

Database WPIL, accession No. 89–231675 (32), Derwent Publications Ltd., London, GB; 3 Jul. 1989 (Abstract of Japan 01–167342).

Database WPIL, accession No. 91–242204 (33), Derwent Publications Ltd., London, GB; 5 Jul. 1991 (Abstract of Japan 01–157169).

Primary Examiner—Mark L. Warzel
Attorney, Agent, or Firm—Foley & Lardner

[57] ABSTRACT

Disclosed is a resin molding comprising a molding composed of a resin composition comprising 100 parts by weight of a substrate resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and at least one member selected from the group consisting of (A) 0.01 to 10 parts by weight of a 1,3-diene polymer having at least one terminal hydroxyl group or a hydrogenation product thereof, (B) 0.01 to 40 parts by weight of a copolymer of ethylene with an unsaturated compound containing a carboxyl group (including an acid anhydride group) and (C) 0.01 to 40 parts by weight of a copolymer of ethylene with an unsaturated compound containing a hydroxyl group, with the proviso that if at least two members of components (A), (B) and (C) are used in combination, the total amount does not exceed 40 parts by weight, which preferably has a coating formed directly on the surface of said molded body. One preferred application of this coated resin molding is an automotive part, especially a bumper.

5 Claims, 1 Drawing Sheet

RESIN MOLDING

CROSS-REFERENCE TO RELATED APPLICATIONS

This application is a divisional of Ser. No. 07/828,460, filed Jan. 31, 1992, now U.S. Pat. No. 5,276,093 issued Jan. 4, 1994, which is a continuation-in-part of Ser. No. 07/612,488, filed Nov. 14, 1990, now U.S. Pat. No. 5,196,270, issued Mar. 23, 1993.

BACKGROUND OF INVENTION

1. Field of the Invention

The present invention relates to a coated resin molding comprising a molding and a coating formed directly on the surface of the molding.

2. Description of the Related Art

It is known that since a polypropylene resin has no polar group in the structure thereof and has a high crystallinity, the adhesion of a paint to the polypropylene resin is very poor. Accordingly, for improving this poor adhesion, a primer is applied on the surface of polypropylene or the surface is modified by a plasma treatment or the like and then a paint is applied to the surface.

However, this conventional coating method involves the following problems.

In the primer coating method, since an expensive primer has to be used or the number of coating steps increases, the coating cost increases. Furthermore, since it is necessary to evaporate a solvent contained in the primer, the working environment is contaminated and there is a risk of a fire, and a problem arises as regards the safety.

In the plasma treatment method, since a high vacuum should be required, an expensive apparatus is necessary for this purpose, and increase of the cost cannot be avoided because the treatment is conducted batchwise. Moreover, the plasma-treated surface is unstable, and if the surface falls in contact with a foreign substance, the adhesiveness to a paint is reduced. Accordingly, the properties of the formed coating are often uneven. Thus, handling of a molding having the plasma-treated surface is troublesome.

Accordingly, if the primer-coating step or the plasma treatment can be omitted, the coating process will be simplified, the working environment will be improved and the manufacturing cost will be reduced. Therefore, many investigations have been made for attaining this object.

However, inspite of much effort, there has not been developed a process for attaining this object. Therefore, the above-mentioned primer coating treatment or plasma treatment cannot be omitted in case of polypropylene-based resin materials.

Such an improved surface characteristic of a resin molding that no primer is needed for coating it with a paint does not, of course, interfere with the use of a primer.

SUMMARY OF THE INVENTION

Under this background, we made research with a view to solving the above-mentioned problem, and as the result, it was found that the above-mentioned problem can be solved by using a specific resin composition for a molding to be coated. We have now completed the present invention based on this finding.

More specifically, in accordance with the present invention in one or a first aspect thereof, there is provided:

a coated resin molding which comprises:

a molding composed of a resin composition comprising 100 parts by weight of a base resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and at least one member selected from the group consisting of (A) 0.01 to 10 parts by weight of a 1,3-diene polymer having at least one terminal hydroxyl group or a hydrogenation product thereof, which includes an acid anhydride group, and (C) 0.01 to 40 parts by weight of a copolymer of ethylene with an ethylenically unsaturated compound containing a hydroxyl group, provided that the total amount of components (A) and (C) does not exceed 40 parts by weight: and a coating formed directly on the surface of said molding.

In accordance with the present invention in another or a second aspect thereof, there is provided:

a coated resin molding which comprises:

a molding composed of a resin composition consisting essentially of 100 parts by weight of a base resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and a member which is (B) 0.01 to 40 parts by weight of a copolymer of ethylene with an ethylenically unsaturated compound containing a carboxyl group, which includes an acid anhydride group: and a coating formed directly on the surface of said molding.

In accordance with the present invention in still another or a third aspect thereof, there is provided:

a resin molding which comprises:

a molding composed of a resin composition comprising 100 parts by weight of a base resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and members of (A) 0.01 to 20 parts by weight of a 1,3-diene polymer having at least one terminal hydroxyl group or a hydrogenation product thereof and (B) 0.01 to 30 parts by weight of a copolymer of ethylene with an ethylenically unsaturated compound containing a carboxyl group, which includes an acid anhydride group.

In accordance with the present invention in a further or a fourth aspect thereof, there is provided:

a coated resin molding which comprises:

a molding composed of a resin composition comprising 100 parts by weight of a base resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and members (B) 0.01 to 20 parts by weight of a copolymer of ethylene with an ethylenically unsaturated compound containing a carboxyl group, which includes an acid anhydride group and (C). 0.01 to 30 parts by weight of a copolymer of ethylene with an ethylenically unsaturated compound containing a hydroxyl group: and a coating formed directly on the surface of said molding.

In accordance with the present invention in still another or a fifth aspect thereof, there is provided:

a resin molding which comprises:

a molding composed of a resin composition comprising 100 parts by weight of a base resin comprising 100 to 30% by weight of at least one propylene polymer selected from the group consisting of propylene/ethylene block copolymers having an ethylene content of 3 to 45% by weight and propylene/ethylene random copolymers having an ethylene content of 0.5 to 10% by weight and 0 to 70% by weight of an elastomer, and a member of (A) 0.01 to 10 parts by weight of a 1,3-diene polymer having at least one terminal hydroxyl group or a hydrogenation product thereof, the molding being a product of injection molding.

In the present invention, by using a specific resin composition, contrary to the conventional common knowledge that direct coating on a propylene-based resin material is impossible, a coating can be formed on the surface of a molding without a surface-modifying treatment such as a primer coating or plasma treatment, and a coated molding article having a good paint adhesion can be obtained. This is an unexpected surprising finding.

DETAILED DESCRIPTION OF THE PREFERRED EMBODIMENTS

[I] Resin Molding

Figure 1:
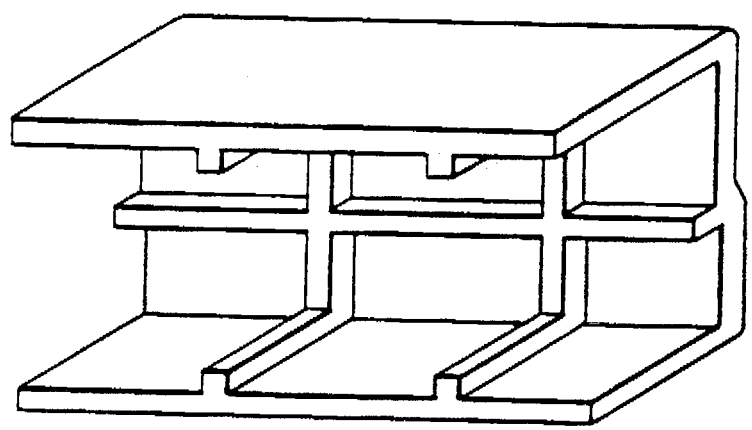
FIG. 1 is a perspective view showing a molding having a length of 340 mm and a height of 140 mm, assumed as an automotive bumper test piece, which was used for evaluation in the examples.

The resin molding used for the coated resin molding of the present invention is obtained by molding a composition comprising constituent components described below in a desired shape.

(1) Resin Composition

1) Constituent Components

Propylene Resin

A crystalline propylene/ethylene block copolymer having an ethylene content of 3 to 45% by weight, preferably 5 to 40% by weighs, and/or a crystalline propylene/ethylene random copolymer having an ethylene content of 0.5 to 10% by weight, preferably 1 to 5% by weight, is used as the propylene resin in the present invention. The propylene copolymer resin may further comprise an optional comonomer component in an amount not substantially inhibiting attainment of the intended effects of the present invention (for example, smaller than 30% by weight, preferably smaller than 15% by weight). As the comonomer, there can be mentioned other α-olefins such as 1-butene, 3-methylbutene-1, 4-methylpentene-1, 1-hexene and 1-pentene.

It is preferred that the flexural modulus of elasticity, measured according to JIS K-7203, of the random or block copolymer be 3,000 to 20,000 kg/cm², especially 4,000 to 18,000 kg/cm², particularly especially 5,000 to 15,000 kg/cm². The melt flow rate (MFR) of the copolymer resin is not particularly critical, but it is preferred that the melt flow rate determined according to ASTM D-1238 be 0.01 to 20.0 g/10 min, especially 0.1 to 100 g/10 min, particularly especially 0.5 to 50 g/10 min.

Of the above-mentioned propylene copolymers, a propylene/ethylene block copolymer is preferably used. The copolymer resin can be appropriately selected from commercially available products and be used.

(A) Diene Polymer Having Terminal Hydroxyl Group or Hydrogenation Product Thereof [Component (A)]

A diene polymer having a terminal hydroxyl group or a hydrogenation product thereof is used as component (A). As the diene polymer having a terminal hydroxyl group, there can be mentioned, for example, polyhydroxypolybutadiene.

More specifically, there are included polymers liquid, semi-solid or solid at normal temperature, which have a molecular weight of 200 to 100,000, preferably 500 to 50,000, especially preferably 800 to 10,000. The average number of hydroxyl groups per molecule is preferably 1 to 10, especially preferably 1.5 to 5. A polymer having a hydroxyl value of 15 to 250 KOH mg/g, especially 25 to 125 KOH mg/g, is preferably used.

The diene polymer having a terminal hydroxyl group can be prepared by using 1,3-diene as the starting material according to a known process, for example, the radical polymerization process or the anion polymerization process. More specifically, a process disclosed, for example, in Japanese Unexamined Patent Publication No. 51-71391 can be adopted.

In the case where the preparation is carried out according to the radical polymerization, the intended polymer can be easily obtained by polymerizing a diene monomer by using hydrogen peroxide as the polymerization initiator.

In the case where the preparation is carried out according to the anion polymerization, the intended polymer can be obtained by polymerizing a conjugated diene in the presence of an anion polymerization catalyst such as an alkali metal or organic alkali metal compound according to known procedures, and reacting the obtained living polymer having a structure, in which an alkali metal is bonded to at least one of both of the terminals, with a monoepoxy compound, formaldehyde, acetaldehyde, acetone, a halogenoalkylene oxide or a polyepoxide.

At least one conjugated diene monomer is used as the starting monomer of the polymer. As the conjugated diene monomer, there can be mentioned 1,3-butadiene, 1,3-pentadiene, isoprene, chloroprene, 2,3-dimethyl-1,3-butadiene and 1-phenyl-1,3-butadiene.

The hydrogenation product of the diene polymer having a terminal hydroxyl group is obtained by hydrogenating the above-mentioned diene polymer having a terminal hydroxyl group according to a customary process, for example, the process disclosed in Japanese Unexamined Patent Publication No. 51-71391.

The hydrogenation degree may be such that all or parts of double bonds contained in the polymer are hydrogenated. A hydrogenated polymer having an iodine value of 0 to 20 g/100 g, especially 0 to 5 g/100 g, is preferably used.

These diene polymers having a terminal hydroxyl group and hydrogenation products thereof can be used singly or in the form of mixtures of two or more of them.

(B) Copolymer of Ethylene with Unsaturated Compound Containing Carboxyl Group (Including Acid Anhydride Group) [Component (B)]

The copolymer of ethylene with an unsaturated compound containing a carboxyl group (including an acid anhydride group) is, for example, a polymer in which ethylene is copolymerized with acrylic acid randomly or at certain intervals. From the structural viewpoint, there is generally meant a polymer having a structure in which a carboxyl group-containing compound, that is, an unsaturated carboxylic acid compound or anhydride thereof, is copolymerized irregularly or regularly in a branched or linear carbon chain.

More specifically, there are included polymers liquid, semi-solid or solid at normal temperature, in which the content of the unsaturated carboxylic acid or its acid anhydride is 0.1 to 40% by weight, preferably 0.5 to 35% by weight, especially preferably 1 to 30% by weight, and the melt flow rate (MFR) determined according to JIS K-6760 is 0.1 to 1,000 g/10 min, preferably 0.5 to 700 g/10 min.

The copolymer of ethylene with the unsaturated carboxylic acid compound or its acid anhydride is prepared by using ethylene and the unsaturated carboxylic compound or its acid anhydride according to a known process, for example, the high-pressure radical polymerization process. In the case where the preparation is carried out according to the high-pressure radical polymerization process, the intended copolymer is prepared by continuously feeding ethylene, an unsaturated carboxylic acid compound or an anhydride thereof and a radical polymerization initiator into a reaction zone maintained, for example, at a pressure of 1,000 to 3,000 atmospheres and a temperature of 90° to 300° C., so that the ratio of ethylene to the unsaturated carboxylic acid or its anhydride is in the range of from 10,000/1 to 100/2, converting 3 to 20% of ethylene to a copolymer, and continuously withdrawing the formed copolymer from the reaction zone.

As the unsaturated carboxylic acid compound and its anhydride, there can be mentioned acrylic acid, methacrylic acid, crotonic acid, maleic acid, fumaric acid, itaconic acid, citraconic acid, tetrahydrophthalic acid, norbornene-5,6-dicarboxylic acid, and acid anhydrides thereof. Acrylic acid and methacrylic acid are preferred.

Terpolymers and multi-component polymers comprising, as the third copolymerization component in addition to ethylene and the unsaturated carboxylic acid component, unsaturated carboxylic acid esters such as methyl acrylate, ethyl acrylate, butyl acrylate and methyl methacrylate, vinyl aromatic compounds such as styrene, α-methylstyrene and vinyltoluene, nitrile compounds such as acrylonitrile and methacrylonitrile, vinylpyridines such as 2-vinylpyridine, vinyl ethers such as methylvinyl ether and 2-chloroethylvinyl ether, vinyl halides such as vinyl chloride and vinyl bromide, vinyl esters such as vinyl acetate, and acrylamide, can be used.

These copolymers can be used singly or in the form of mixtures of two or more of them.

(C) Copolymers of Ethylene with Hydroxyl Group-Containing Unsaturated Compound [Component (C)]

The copolymer of ethylene with the hydroxyl group-containing unsaturated compound is, for example, a polymer in which ethylene is copolymerized with 2-hydroxyethyl methacrylate randomly or at certain intervals. From the structural viewpoint, there are generally meant polymers having a structure in which a hydroxyl group-containing unsaturated compound is copolymerized in a branched or linear carbon chain regularly or irregularly.

More specifically, there are included liquid, semi-solid and solid polymers in which the content of the hydroxyl group-containing compound is 0.1 to 50% by weight, preferably 0.5 to 45% by weight, especially preferably 1 to 40% by weight, and the molecular weight is 200 to 200,000, preferably 500 to 150,000, especially preferably 800 to 100,000.

The copolymer of ethylene with the hydroxyl group-containing unsaturated compound is prepared by using ethylene and the hydroxyl group-containing unsaturated compound according to a known process, for example, the high-pressure radical polymerization process. In the case where the preparation is carried out according to the high-pressure radical polymerization process, the intended copolymer is prepared by continuously supplying ethylene, the hydroxyl group-containing unsaturated compound and a radical reaction initiator into a reaction zone maintained, for example, at a pressure of 1,000 to 3,000 atmospheres and a temperature of 90° to 280° C., so that the ratio of ethylene to the hydroxyl group-containing unsaturated compound is in the range of from 1/0.0001 to 1/0.02, converting 3 to 20% of ethylene to a copolymer, and continuously withdrawing the formed copolymer from the reaction zone.

As the hydroxyl group-containing unsaturated compound, there can be mentioned (i) mono(meth)acrylates of lower alkylene glycols of e.g., 2 to 3 carbon atoms such as 2-hydroxyethyl methacrylate, 2-hydroxyethyl acrylate and 2-hydroxypropyl methacrylate, (ii) mono(meth)acrylates of poly-lower-alkylene glycols of e.g., 2 to 3 carbon atoms in the alkylene group such as poly(ethylene glycol) monomethacrylate, and (iii) mono- and di(meth)acrylates of glycerols. Among them, the compounds (i) and (ii) are preferably used, and the compound (i) is especially preferably used.

Terpolymers and multi-component polymers comprising, as the third copolymerization component in addition to ethylene and the hydroxyl group-containing unsaturated compound, unsaturated carboxylic acid esters such as methyl acrylate, ethyl acrylate, butyl acrylate and methyl methacrylate, vinyl aromatic compounds such as styrene, α-methylstyrene and vinyltoluene, nitrile compounds such as acrylonitrile and methacrylonitrile, vinylpyridines such as 2-vinylpyridine and 4-vinylpyridine, vinyl ethers such as methylvinyl ether and 2-chloroethylvinyl ether, vinyl halides such as vinyl chloride and vinyl bromide, vinyl esters such as vinyl acetate, and acrylamide, can be used.

These copolymers can be used singly or in the form of mixtures of two or more of them.

Additional Components

Additional components as described below can be incorporated into the resin composition used in the present invention in addition to the above-mentioned indispensable components, so far as attainment of the intended effects of the present invention is not inhibited.

As the additional component, there can be mentioned polyolefins other than the above-mentioned polyolefins, for example, polyethylene resins such as low pressure method polyethylene, medium pressure method polyethylene, high pressure method polyethylene and linear low density polyethylene, stereoregular polypropylene, stereoregular poly-1-butene and stereoregular poly-4-methyl-1-pentene, olefinic, styrenic and acrylic elastomers, and inorganic fillers such as natural silica, e.g., quartz, natural silica formed by the wet method or the dry method, natural silicates, e.g., kaolin, mica, talc and asbestos, synthetic silicates, e.g., calcium silicate and aluminum silicate, metal hydroxides, e.g., magnesium hydroxide and aluminum hydroxide, metal oxides, e.g., alumina and titania, calcium carbonate, metal powders, e.g., aluminum and bronze powders, carbon black, glass fibers, carbon fibers, and whiskers of potassium titanate, calcium sulfate, zinc oxide, silicon nitride, sapphire, beryllia, boron carbide and silicon carbide. Moreover, other additives such as colorants, stabilizers, dispersing assistants, molecular weight-adjusting agents, crosslinking agents and nucleating agents can be used.

Among these additional components, the above-mentioned olefinic elastomer is preferably used because the rigidity or impact resistance can be adjusted.

As the olefinic elastomer, there can be mentioned copolymers of two or more of α-olefins such as ethylene, propylene, 1-butene, 1-pentene and 1-hexene, and copolymers of these α-olefins with unconjugated dienes. The copolymer is preferably an amorphous or low crystalline copolymer having an initial elasticity modulus lower than 400 kg/cm$^2$, preferably lower than 200 kg/cm$^2$, especially preferably lower than 100 kg/cm$^2$, as measured according to JIS K-6301.

As specific examples of the unconjugated diene, there can be mentioned dicyclopentadiene, 1,4-hexadiene, cyclooctadiene, dicyclooctadiene, methylene-norbornene, 5-ethylidene-2-norbornene, 5-vinyl-2-norbornene, 5-methylene-2-norbornene, 5-methyl-1,4-hexadiene and 7-methyl-1,6-octadiene.

The olefinic elastomer has a Mooney viscosity $ML_{1+4}$, as measured at 100° C., of 1 to 200, preferably 5 to 150, especially preferably 7 to 100.

As the olefinic elastomer, an ethylenic elastomer is especially preferred in view of the quality and stability.

As the ethyleneic elastomer, there can be mentioned an ethylene/propylene copolymer rubber (EPM), an ethylene/1-butene copolymer rubber, an ethylene/propylene/1-butene copolymer rubber, an ethylene/propylene/unconjugated diene copolymer rubber (EPDM), an ethylene/1-butene/unconjugated diene copolymer rubber and an ethylene/propylene/1-butene/unconjugated diene copolymer. Among these ethylenic elastomers, EPM is especially preferred because the surface roughening is hardly caused in the molded article and a beautiful coated surface is obtained.

It is known that the incorporation of an elastomer generally results in promotion of the coating adhesive force. In the present invention, even if an elastomer is not incorporated at all, a good coating adhesive force can be obtained by direct coating. This is an unexpected effect attained by the present invention.

2) Mixing Ratios

The mixing ratios of the components constituting the resin composition used in the present invention are such that the resin composition comprises 100 parts by weight of the propylene resin including the above-mentioned elastomer, and at least one member selected from the group consisting of (A) 0.01 to 10 parts by weight of the diene polymer having a terminal hydroxyl group or the hydrogenation product thereof, (B) 0.01 to 40 parts by weight of the copolymer of ethylene with the unsaturated compound containing a carboxyl group (including an acid anhydride group) and (C) 0.01 to 40 parts by weight of the copolymer of ethylene with the hydroxyl group-containing unsaturated compound.

The preferred amount of the component (A) is 0.05 to 7 parts by weight, especially 0.1 to 5 parts by weight. The preferred amount of the component (B) is 0.05 to 35 parts by weight, especially 0.1 to 30 parts by weight. The preferred amount of the component (C) is 0.05 to 35 parts by weight, especially 0.1 to 30 parts by weight.

Ordinarily, one of the components (A), (B) and (C) is used singly, but two or more of the components (A), (B) and (C) can be used in combination. When two or more of the components (A), (B) and (C) are used in combination, the total amount is controlled to up to 40 parts by weight, preferably 0.05 to 35 parts by weight, especially preferably 0.1 to 30 parts by weight.

If the amount of the component (A), (B) or (C) or the total amount in case of the combined use is below the above-mentioned range, the reproducibility of the paint adhesion is poor or the paint adhesion strength is insufficient. If the amount exceeds the above-mentioned range, since the amount added of the expensive polymer is large, the cost of the resin composition increases, and the paint adhesion is degraded by bleeding of the polymer or delamination.

In the case where the elastomer is incorporated as the additional component, the elastomer occupies 1 to 70% by weight of 100 parts by weight of the total amount of the propylene resin and the elastomer. In view of the mechanical strength, the elastomer is preferably used in an amount of 5 to 60% by weight, especially 10 to 50% by weight, based on the total amount of the propylene resin and the elastomer.

3) Mixing

The resin composition to be used as the starting material of the resin molding of the present invention is prepared by mixing the above-mentioned constituent components.

The order of the mixing of the constituent components is not particularly critical. There can be mentioned, for example, a method in which the constituent components are simultaneously mixed and a method in which optional two components are mixed in advance and the remaining components are then mixed.

Any of known kneaders such as a Brabender Plastograph, a single- or twin-screw extruder, a high power screw kneader, a Banbury mixer and a roll can be used for the mixing.

(2) Molding

A resin molding used is obtained by molding the above-mentioned resin composition by an optional molding method.

Any of conventional molding methods can be adopted. For example, there can be adopted injection molding, compression molding, extrusion molding (sheet molding or forming and blow molding), and the like.

The coating process of the present invention can be effectively applied even to an injection-molded body having a complicated shape.

[II] Coating

As the process for coating the resin molding in the present invention, there can be adopted the conventional coating method from which the surface-modifying step such as the primer coating step or plasma treatment step is omitted. Namely, a paint is directly applied on a molded article composed of the above-mentioned resin composition, if necessary after the degreasing washing.

By the term "direct coating" used herein is meant coating conducted without performing the conventional primer coating or plasma treatment. In the present invention, a surface treatment not substantially modifying the surface, to be conducted before coating of a paint, is not excluded from the scope of the present invention, so far as the treatment does not deviate from the technical idea of the present invention.

A degreasing washing can be mentioned as an example of such surface treatment.

The degreasing washing is an ordinary operation conducted just before the coating operation. By this degreasing washing, the hand dirt and machine oil unavoidably adhering to the surface of the molding through the steps of from molding of the resin composition to coating of the paint can be removed. For example, there can be adopted a washing method using an organic solvent, an organic solvent vapor, water, steam, an acid, an aqueous alkali or an aqueous solution of a surface active agent. The washing method using a vapor of an organic solvent is preferably used.

Any of spray blow coating, brush coating and roller coating can be adopted for coating a paint.

Paints widely used, such as an acrylic paint, an epoxy paint, a urethane paint, an alkyd paint and a melamine paint can be used in the present invention. Of these paints, an acrylic paint and a urethane paint are preferably used, and an acrylic paint is especially preferably used.

[III] Coated Resin Molded Article

In the present invention, the paint is applied in a thickness of 10 to 100 μm, preferably 20 to 70 μm, and the coating is bonded to the surface of the molding With a peel strength of at least 400 g/cm, especially 700 to 2,000 g/cm. Accordingly, the coated molding of the present invention can be utilized for various industrial parts, for example, exterior automotive trims such as a bumper, a mud guard, a side braid, a wheel cap and a spoiler, interior automotive trims such as an instrument panel, a lever, a knob and an inner lining, electric appliances such as a pot, a cleaner, a washing machine, a refrigerator and an audio machine, and daily necessaries such as a color box and a container case.

As one preferred application example of the present invention, there can be mentioned an automotive part, typically a bumper, comprising a molding composed of a resin composition and a coating formed directly on the surface of the molding, said resin composition comprising (a) 40 to 80 parts by weight of a propylene/ethylene block copolymer having an ethylene content of 3 to 25% by weight and containing 3 to 35% by weight of a fraction soluble in xylene at normal temperature, which has an ethylene content of 20 to 70% by weight, MFR of the entire copolymer being 5 to 120 g/10 min, (b) 60 to 20 parts by weight of at least one elastomer selected from the group consisting of ethylene type elastomers, hydrogenated styrene/butadiene block copolymers and hydrogenated styrene/isoprene block copolymers, (c) 0.01 to 10 parts by weight, preferably 0.1 to 5 parts by weight, per 100 parts by weight of the sum of components (a) and (b), of a diene polymer having a terminal hydroxyl group or a hydrogenation product thereof, and (d) 1 to 40 parts by weight, preferably 1 to 25 parts by weight, per 100 parts by weight of the sum of components (a) and (b), of at least one filler selected from the group consisting of a plate filler having a specific surface area of at least 30,000 cm$^2$/g, a substantial entire length smaller than 15 μm, an average particle size of 0.2 to 3 μm and an average aspect ratio of at least 4 and a fibrous filler having an average diameter smaller than 2 μm and an average aspect ratio of at least 5.

Since a specific polypropylene resin composition comprising specific components is used, this automotive part is characteristic over an automotive part formed of a conventional polypropylene resin in that only by direct coating of a paint, a practically sufficient mechanical strength can be attained, and the automotive part has practically sufficient mechanical strength and durability and a beautiful coating appearance. Accordingly, the automotive part is excellent as a fender, a door panel, a bumper, a spoiler, a mud guard, a side braid, a wheel cap, an instrument panel or the like. Moreover, the coating step is simplified, the working environment is improved, and the cost is reduced.

The propylene/ethylene block copolymer as the component (a) is a resin containing 3 to 35% by weight, preferably 5 to 30% by weight, of a substantially amorphous fraction soluble in xylene at normal temperature, which has an ethylene content of 20 to 70% by weight. MFR (as measured at 230° C. under a load of 2.16 kg) of the entire copolymer resin is 5 to 120 g/10 min, preferably 5 to 80 g/10 min, and the ethylene content of the copolymer resin is 3 to 35% by weight, preferably 4 to 30% by weight.

The ethylene content referred to herein is determined according to the conventional method, for example, the infrared spectrum analysis method or the NMR method.

The fraction soluble in xylene at normal temperature is determined in the following manner.

Namely, 2 g of the sample is immersed and dissolved in 500 g of boiling xylene for 5 hours, and the solution is cooled to room temperature and the precipitated solid phase is recovered by filtration using G4 type glass filter and is then dried. The weight of the solid phase is measured, and the amount of the fraction soluble in xylene at normal temperature is determined by inverse operation from the weight of the solid phase.

MFR is determined according to JIS K-7210.

An ordinary stereoregular catalyst is used for the production of this copolymer resin. A typical instance of the catalyst is a composite catalyst comprising a titanium halide compound or a supported titanium catalyst component and an organic aluminum halide compound, and according to need, an electron donor compound such as benzoic acid is added, or the catalyst is activated by such means as copulverization.

This propylene/ethylene block copolymer resin can be a terpolymer or multi-component polymer comprising other unsaturated monomer [for example, an α-olefin such as butene-1, hexene-1, octene-1 or 1,4-methylpentene-1, a vinyl ester such as vinyl acetate, or an unsaturated organic acid or its derivative such as (meth)acrylic acid, (meth) acrylic acid ester or maleic anhydride] in such an amount as not substantially inhibiting attainment of the effects of the present invention.

Furthermore, a mixture of two or more of the foregoing copolymer resins can be used.

The elastomer as the component (b) is at least one member selected from the group consisting of ethylenic elastomers such as ethylene/propylene copolymer rubbers (EPM), ethylene/propylene/unconjugated diene terpolymer rubbers (EPDM) and ethylene/propylene/butene-1 terpolymer rubbers, hydrogenated styrene/butadiene block copolymers and hydrogenated styrene/isoprene block copolymers.

An ethylene/propylene copolymer rubber having a propylene content of 20 to 55% by weight, especially 25 to 50% by weight, and a Mooney viscosity $ML_{1+4}$ (100° C.) of 10 to 100, especially 15 to 90, is preferably used.

An ethylene/propylene/unconjugated rubber (EPDM) having an iodine value smaller than 20 is preferably used.

An ethylene/propylene/butene-1 copolymer rubber having a propylene content of 20 to 55% by weight, especially 25 to 50% by weight, and a butene-1 content of 3 to 15% by weight, especially 5 to 12% by weight, and MFR (as measured at 230° C. under a load of 2.16 kg) of 0.5 to 25 g/10 min, especially 1 to 20 g/10 min, is preferably used.

The contents of the respective components are determined according to the conventional method such as the infrared spectrum analysis method or the NMR method. Preferably, the rubber is substantially amorphous. From the viewpoint of attainment of the intended effects of the present invention, it is preferred that the crystallinity be lower than 5%, especially lower than 4%, particularly especially lower than 3%. The crystallinity is determined according to the X-ray diffractometry. In many cases, the rubber is supplied in the form of pellets, but the rubber can be supplied in the form of a crumb or bale, so far as the kneading operation is smoothly carried out. The process for the preparation of the rubber is not particularly critical. Even if a small amount of a comonomer other than the above three components is further copolymerized, attainment of the intended effects of the present invention is not substantially hindered.

The hydrogenated styrene/butadiene block copolymer is a completely or partially hydrogenated styrene/butadiene block copolymer, that is, a so-called styrene/ethylene/ butylene/styrene block copolymer. The hydrogenation degree is generally at least 95%, but a copolymer having a hydrogenation degree of at least 99% is preferably used. The styrene content of the block copolymer is 5 to 50% by weight. From the viewpoint of the balance of the physical properties of the automotive part and the coating property, a block copolymer having a styrene content of 10 to 50% by weight, especially 20 to 40% by weight, is preferably used. Preferably, MFR (determined at 230° C. under a load of 2.16 kg) is 20 g/10 min or lower, more preferably 15 g/min or lower, and in the case where the injection moldability is important, MFR of 1 to 15 g/10 min, preferably 5 to 15/10 min, is especially preferred. This component is effective for providing the composition with the good balance in coating capability and physical properties, especially in providing the composition with improved impact resistance at lower temperatures and with improved characteristics in terms of brittleness.

The hydrogenated styrene/isoprene block copolymer is a completely or partially hydrogenated styrene/isoprene block copolymer, that is, a so-called styrene/ethylene/propylene block copolymer. The hydrogenation degree is generally at least 95%, but a copolymer having a hydrogenation degree of at least 99% is preferably used. The styrene content of the block copolymer is 5 to 50% by weight. From the viewpoint of the balance of the physical properties of the automotive part and the coating property, a block copolymer having a styrene content of 10 to 50% by weight, especially 15 to 45% by weight, is preferably used. Preferably, MFR (determined at 230° C. under a load of 2.16 kg) is 20 g/10 min or lower, and in the case where the injection moldability is important, MFR of 0.5 to 20 g/10 min is especially preferred.

The following fillers can be used as the component (d).

Plate Filler

Plate fillers having the above-mentioned properties are used as the plate filler. For example, talc and mica can be mentioned. Preferably, the talc or mica has a specific surface area of at least 35,000 cm$^2$/g, an average particle size of 0.2 to 2.5 µm, such a particle size distribution that the content of particles having a size smaller than 10 µm is at least 95%, the content of particles having a size smaller than 5 µm is at least 80% and the content of particles having a size smaller than 1 µm is 5 to 50%, and an average aspect ratio of at least 5. Talc or mica having a specific surface area of at least 37,000 cm$^2$/g, an average particle size of 0.3 to 2.2 µm, such a particle size distribution that the content of particles having a size smaller than 10 µm is at least 97%, the content of particles smaller than 5 µm is at least 82% and the content of particles having a size smaller than 1 µm is 10 to 45%, and an aspect ratio of at least 6 is especially preferably used. Talc having the above-mentioned properties is particularly especially preferably used.

Ores produced in China, Australia and U.S.A. are preferably used as the talc ore, and an ore produced in China is especially preferably used. The talc may be surface-treated with an ester, a glycol, a coupling agent, a fatty acid, a salt thereof or a surface active agent, and by this treatment, performances such as the strength and coating property of the automotive part are effectively improved.

Fibrous Filler

A fibrous filler having an average diameter smaller than 2 µm, especially 0.1 to 2 µm, and an average aspect ratio (the average value of the ratio of the fiber length to the fiber diameter) of at least 5, especially at least 10, is preferably used as the fibrous filler. As the fiber, there can be mentioned, for example, a potassium titanate fiber, a calcium sulfate fiber, a magnesium sulfate fiber, a calcium silicate fiber, a glass fiber, a synthetic mineral fiber, a rock wool fiber, a carbon fiber, a silicon nitride whisker and an aramid fiber. A potassium titanate fiber, a calcium sulfate fiber and a magnesium sulfate fiber are preferably used.

The fibrous filler can be surface-treated as in case of the plate filler, and the strength and coating property of the automotive part can be improved by this surface treatment.

The specific surface area is measured according to the so-called air permeation method by using a constant pressure specific surface area measuring apparatus, for example, a powder specific surface area measuring apparatus Model SS-100 supplied by Shimadzu Seisakusho.

The particle size distribution is expressed by the cumulative distribution value obtained by the liquid phase sedimentation type light transmission method. A measurement apparatus Model SA-CP supplied by Shimadzu Seisakusho (for example, SA-CP 2-20) can be adopted.

The average particle size is the particle size at the point of 50% in the cumulative distribution curve of the particle size measured by the above-mentioned apparatus for the measurement of the particle size distribution. The fiber diameter and fiber length are measured by the observation under a microscope.

The composition comprising the above-mentioned components (a) through (d) can further comprise additional components as described below.

An ethylene polymer as described below is especially preferably used as the additional component.

Namely, an ethylene polymer having MFR (measured at 190° C. under a load of 2.16 kg) of 0.1 to 50 g/10 min, especially 1 to 30 g/10 min, can be mentioned. As the examples of the ethylene polymers, there can be mentioned homopolymers of ethylene (polyethylene), block, random and graft copolymers or multi-component polymers of ethylene with other α-olefin (for example, propylene, butene, pentene, hexene or heptene), an unsaturated organic acid or its anhydride (for example, acrylic acid, methacrylic acid, maleic acid, maleic anhydride or itaconic acid), an unsaturated ester (for example, vinyl acetate, methyl acrylate or methyl methacrylate), or a so-called vinyl monomer such as vinylsilane or an aromatic vinyl compound, and modification products of these polymers. Mixtures of two or more of these polymers can also be used.

Linear low density polyethylene or high density polyethylene is preferably used as the ethylene polymer. In case of a copolymer of ethylene with other vinyl monomer, ethylene should occupy more than ½ of the weight of the copolymer.

The ethylene polymer further improves the coating strength, and is also effective for preventing the change of the gloss of the coated surface and improving the scratch resistance, impact resistance and appearance.

It is preferred that the amount of the ethylene polymer incorporated into the resin composition be less than 10% by weight, especially less than 8% by weight, particularly especially 2 to 5% by weight.

The present invention is based on the findings that resin compositions of specified components have such surface characteristics of moldings of the resin composition that no primer is needed for coating the molding with a paint.

It is, however, quite natural that such improved surface characteristics or coatability does not interfere with the use of a primer if so desired.

Further, the modifier polymer (A), (B) and (C) are used so that at least one of them is blended with the propylene polymer+an elastomer which is an optional component, and the uses of these modifier polymers in combination of (A)+(B) and of (B)+(C) are within this concept. In accordance with the present invention in the third and the fourth aspects referred to hereinbefore, synergism may be found in the combinations of the modifier (A)+(B) and of (B)+(C).

When the modifier polymer is a combination of (A) and (B), the amounts of (A) and (B) are preferably 0.01 to 20 parts by weight and 0.01 to 30 parts by weight, and more preferably 0.05 to 17 parts by weight for (A) and 0.05 to 20 parts by weight for (B).

When the modifier polymer is a combination of (B) and (C), the amounts of (B) and (C) are preferably 0.01 to 20 parts by weight for (B) and 0.01 to 30 parts by weight for (C), and more preferably 0.05 to 10 parts by weight for (B) and 0.05 to 25 parts by weight for (C).

The moldings of resin compositions in accordance with the present invention can be formed by any molding or forming procedure applicable to a group of resin compositions which are thermoplastic in nature, to which group the resin compositions in accordance with the present invention belong. In accordance with the present invention in the fifth aspect referred to hereinbefore, the use of a modifier polymer of (A) in the resin composition is particularly advantageous for injection molding of the resin composition.

It is to be understood that these particular embodiments fall within the inventive concept in its broadest scope and that all the disclosure given to the present invention in its broadest scope including, for example, examples of components in their types and then quantitative conditions will apply unless the application is expressly indicated.

The present invention will now be described in detail with reference to the following examples.

Incidentally, all of "parts" in the examples are by weight.

Experiment I

Molding conditions for obtaining test pieces from resin compositions obtained in the examples and test methods for the evaluation were as described below.

§MOLDING CONDITIONS:

Molding Machine

Injection molding machine Model M40A-SJ supplied by Meiki Seisakusho

Molding Temperature

230° C.

Molding Article

Plate (65 mm×65 mm×2 mm) and test piece for three-point flexural elasticity modulus test (90 mm×10 mm×4 mm)

§ METHODS FOR EVALUATION OF PHYSICAL PROPERTIES:

Flexural Elasticity Modulus

The measurement was conducted according to JIS K-7203.

MFR

The measurement was conducted according to ASTM D-1238.

§ COATING:

Paint

Coating was carried out by using a one-can acrylic paint or a one-can urethane paint.

Coating Method

Each paint was prepared and spray-coated in a thickness of about 40 μm by an air spray gun. Then, the coating was baked and dried at 100° C. for 60 minutes in case of the acrylic paint or at 120° C. for 60 minutes in case of the urethane paint.

Evaluation of Paint Adhesion (Cross Cut Test)

Eleven parallel cuts were drawn at intervals of 2 mm in both the longitudinal direction and the lateral direction on the surface of the test piece by a single-edged razor blade to form 100 squares. A cellophane adhesive tape (JIS Z-1522) was sufficiently pressed to the cut surface. The cellophane tape was peeled inward at a stroke while maintaining an angle of about 30° to the coated surface. The state of the square-cut surface was examined, and the number of squares not peeled but left was recorded.

§ EXPERIMENTATION:

EXAMPLES 1 THROUGH 19 AND COMPARATIVE EXAMPLES 1 THROUGH 5

Synthesis of Diene Polymer Having Terminal Hydroxyl Group

In an autoclave having a capacity of 500 ml, 100 g of 1,3-butadiene was polymerized by using 70 g of isopropyl alcohol and 10 g of 60% aqueous hydrogen peroxide in an argon atmosphere at 90° C. for 5 hours. After termination of the reaction, the unreacted monomer was removed, and the formed diene polymer was dried.

The molecular weight of the obtained polymer was about 2,900 and the hydroxyl value was about 88 (KOH mg/g).

Synthesis of Hydrogenation Product of Diene Polymer Having Terminal Hydroxyl Group An autoclave having a capacity of 200 ml was charged with 50 g of the obtained diene polymer having a terminal hydroxyl group, 50 g of cyclohexane and 5 g of a 5%-ruthenium-supported-on-carbon catalyst, and the inner atmosphere was substituted with argon gas and hydrogen gas was introduced into the autoclave until the pressure was elevated to 50 kg/cm$^2$. Then, the temperature was elevated to 100° C. and reaction was carried out for 10 hours while feeding hydrogen gas so that the total pressure was maintained at 50 kg/cm$^2$. After termination of the reaction, hydrogen was removed, and the catalyst was removed by filtration. The formed hydrogenation product was precipitated in methanol, and the precipitate was recovered by filtration and dried to obtain the intended product. The iodine value of the obtained hydrogenated diene polymer was 1.5 (g/100 g), and the hydroxyl value was 87.8 (KOH mg/g).

Preparation of Resin Molding

Components shown in Table 1 were melt-kneaded at 200° C. and pelletized by a twin-screw extruder.

A plate test piece and a test piece for the three-point flexural elasticity modulus test were prepared by injection molding.

The components shown in Table 1 were as described below.

Propylene Resins

Block Copolymer (1):

A propylene/ethylene block copolymer having an ethylene content of 8.2% by weight, a flexural elasticity modulus of 10,000 kg/cm$^2$ and MFR of 33 g/10 min.

Block Copolymer (2):

A propylene/ethylene block copolymer having an ethylene content of 13% by weight, a flexural elasticity modulus of 6,000 kg/cm$^2$ and MFR of 30 g/10 min.

Block Copolymer (3):

A propylene/ethylene block copolymer having an ethylene content of 7.5% by weight, a flexural elasticity modulus of 11,500 kg/cm$^2$ and MFR of 10 g/10 min.

Random Copolymer:

A propylene/ethylene random copolymer having an ethylene content of 3.4% by weight, a flexural elasticity modulus of 10,500 kg/cm$^2$ and MFR of 15 g/10 min.

Homopolymer:

Polypropylene having a flexural elasticity modulus of 13,000 kg/cm$^2$ and MFR of 25 g/10 min.

Olefinic Elastomers
EPM (1):
An ethylene/propylene copolymer rubber having a Mooney viscosity $ML_{1+4}$ (100° C.) of 70 and a specific gravity of 0.86.
EPM (2):
An ethylene/propylene copolymer rubber having a Mooney viscosity $ML_{1+4}$ (100° C.) of 24 and a specific gravity of 0.86.
EPDM:
An ethylene/propylene/ethylidenenorbornene copolymer having a Mooney viscosity $ML_{1+4}$ (100° C.) of 47 and a specific gravity of 0.86.
Hydroxyl Group-Containing Diene Polymers and Hydrogenation Products Thereof
Diene Polymer (1):
The diene polymer having a terminal hydroxyl group, which was obtained in the manner described above.
Hydrogenated Diene Polymer (1):
The hydrogenation product of the above-mentioned terminal hydroxyl group-containing diene polymer, which was obtained in the manner described above.

Hydrogenated Diene Polymer (2):
A hydrogenated butadiene polymer having an iodine value of 0.5 (g/100 g) and a hydroxyl value of 46.9 (KOH mg/g).

Coating of Resin Molding
The plate test piece obtained by molding the above-mentioned resin composition was degreased with a vapor of 1,1,1-trichloroethane for 30 seconds, and the paint was coated on the plate by using an air gun and the coating was baked and dried. The coated plate was allowed to stand at room temperature for 48 hours and the cross cut test was carried out.

The results of the test of the flexural elasticity modulus and paint adhesion of the resin composition are shown in Table 1.

Incidentally, the composition of Comparative Example 5 was too soft, and it was impossible to measure the flexural elasticity modulus.

Furthermore, at the degreasing treatment with a vapor of trichloroethane before the coating operation and at the baking and drying step after the coating operation, the plate as the test piece was conspicuously deformed. Furthermore, convexities and concavities were formed on the surface of the plate, and the evaluation was impossible.

TABLE 1

| | | | Example No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Composition (parts by weight) | Propylene polymer | block copolymer (1) | 60 | 60 | 60 | 60 | 60 | 60 | 60 | 60 | 60 | 100 | — | — | 60 |
| | | block copolymer (2) | — | — | — | — | — | — | — | — | — | — | 100 | — | — |
| | | block copolymer (3) | — | — | — | — | — | — | — | — | — | — | — | — | — |
| | | homopolymer | — | — | — | — | — | — | — | — | — | — | — | — | — |
| | | random copolymer | — | — | — | — | — | — | — | — | — | — | — | 60 | — |
| | Olefinic elastomer | EPM (1) | 40 | 40 | 40 | 40 | 40 | 40 | 40 | 20 | 10 | — | — | 40 | — |
| | | EPM (2) | — | — | — | — | — | — | — | — | — | — | — | — | 40 |
| | | EPDM | — | — | — | — | — | — | — | — | — | — | — | — | — |
| | diene polymer (1) | | 7 | 3 | — | — | — | — | — | — | — | — | — | — | — |
| | hydrogenated diene polymer (1) | | — | — | 7 | 3 | 1 | 0.5 | 0.1 | 1 | 1 | 1 | 2 | 1 | 1 |
| | hydrogenated diene polymer (2) | | — | — | — | — | — | — | — | — | — | — | — | — | — |
| Physical properties | flexural elasticity modulus(kg/cm²) | | 2800 | 3500 | 2900 | 3800 | 3900 | 4100 | 4400 | 5200 | 7300 | 9300 | 5200 | 3400 | 4300 |
| | Cross cut test | acrylic paint | — | — | 94/100 | 100/100 | 100/100 | — | — | 100/100 | 100/100 | 98/100 | 100/100 | 100/100 | 100/100 |
| | | urethane paint | 95/100 | 100/100 | 96/100 | 100/100 | 100/100 | 100/100 | 100/100 | 100/100 | 100/100 | — | 100/100 | 100/100 | 100/100 |

| | | | Example No. | | | | | | Comparative Example No. | | | | |
|---|---|---|---|---|---|---|---|---|---|---|---|---|---|
| | | | 14 | 15 | 16 | 17 | 18 | 19 | 1 | 2 | 3 | 4 | 5 |
| Composition (parts by weight) | Propylene polymer | block copolymer (1) | 80 | 90 | 60 | 60 | 60 | — | 60 | 100 | — | 60 | — |
| | | block copolymer (2) | — | — | — | — | — | — | — | — | — | — | — |
| | | block copolymer (3) | — | — | — | — | — | 60 | — | — | — | — | — |
| | | homopolymer | — | — | — | — | — | — | — | — | 100 | — | — |
| | | random copolymer | — | — | — | — | — | — | — | — | — | — | — |
| | Olefinic elastomer | EPM (1) | — | — | — | 40 | 40 | — | 40 | — | — | 40 | 80 |
| | | EPM (2) | 20 | 10 | — | — | — | 40 | — | — | — | — | — |
| | | EPDM | — | — | 40 | — | — | — | — | — | — | — | — |
| | diene polymer (1) | | — | — | — | — | — | — | — | — | — | — | — |
| | hydrogenated diene polymer (1) | | 1 | 1 | 1 | — | — | — | — | — | 1 | 20 | 20 |
| | hydrogenated diene polymer (2) | | — | — | — | 7 | 7 | 2 | — | — | — | — | — |
| Physical properties | flexural elasticity modulus(kg/cm²) | | 5100 | 7300 | 4400 | 2800 | 4000 | 4600 | 4300 | 10,700 | 12,500 | 2100 | measurement impossible |
| | Cross cut test | acrylic paint | 100/100 | 100/100 | 100/100 | 95/100 | 100/100 | 100/100 | 0/100 | 0/100 | 0/100 | 21/100 | — |
| | | urethane paint | 100/100 | 100/100 | 100/100 | 97/100 | 100/100 | 100/100 | 0/100 | 0/100 | 0/100 | 34/100 | — |

EXAMPLES 20 THROUGH 31 AND COMPARATIVE EXAMPLES 6 THROUGH

Preparation of Molding

A molding was prepared from components shown in Table 2 in the same manner as described in the foregoing examples.

Components other than those used in the foregoing examples, shown in Table 2, were as described below.

Copolymers of Ethylene with Unsaturated Carboxylic Acid or Anhydride Thereof

EAA (1):

An ethylene/acrylic acid copolymer having an acrylic acid content of 13% by weight and MFR of 7 g/10 min as determined according to JIS K-6760, which was obtained by the high-pressure radical polymerization process.

EAA (2):

An ethylene/acrylic acid copolymer having an acrylic acid content of 20% by weight and MFR of 300 g/10 min as determined according to JIS K-6760, which was obtained by the high-pressure radical polymerization process.

Coating of Resin Molding

A plate test piece molded according to the procedures described hereinbefore was degreased with a vapor of trichloroethane for 30 seconds, and a one-can type urethane paint was applied on the plate by using an air gun.

The coated plate was evaluated in the same manner as described hereinbefore. The obtained results are shown in Table 2.

Incidentally, in case of the composition of Comparative Example 8, the flexural elasticity modulus could not be measured and the evaluation by the cross cut test was impossible, as in case of the above-mentioned composition of Comparative Example 5.

EXAMPLES 32 THROUGH 48 AND COMPARATIVE EXAMPLES 9 THROUGH 11

Preparation of Resin Molding

A resin molding was prepared from components shown in Table 3 in the same manner as described in the foregoing examples.

Components other than those used in the foregoing examples, shown in Table 3, were as described below.

Copolymers of Ethylene with Hydroxyl Group-Containing Unsaturated Compound

EHM (1):

An ethylene/2-hydroxyethyl methacrylate copolymer having a 2-hydroxyethyl methacrylate content of 10% by weight and a molecular weight of 54,000, which was obtained according to the high-pressure radical polymerization process.

EHM (2):

An ethylene/2-hydroxyethyl methacrylate/methyl acrylate copolymer having a 2-hydroxyethyl methacrylate content of 10% by weight, a methyl acrylate content of 10% by weight and a molecular weight of 46,000, which was obtained according to the high-pressure radical polymerization process.

EHM (3):

An ethylene/2-hydroxyethyl methacrylate/methyl acrylate having a 2-hydroxyethyl methacrylate content of 10% by weight, a methyl acrylate content of 10% by weight and a molecular weight of 32,000, which was obtained according to the high-pressure radical polymerization process.

EHM (4):

An ethylene/2-hydroxyethyl methacrylate copolymer having a 2-hydroxyethyl methacrylate content of 35% by weight and a molecular weight of 2,300, which was obtained according to the high-pressure radical polymerization process.

TABLE 2

| | | | \multicolumn{9}{c}{Example No.} | | | | | | | | |
|---|---|---|---|---|---|---|---|---|---|---|---|
| | | | 20 | 21 | 22 | 23 | 24 | 25 | 26 | 27 | 28 |
| Composition (parts by weight) | PP | block copolymer (1) | 60 | 60 | 60 | 80 | — | — | — | 60 | 60 |
| | | block copolymer (2) | — | — | — | — | 60 | 100 | — | — | — |
| | | homopolymer | — | — | — | — | — | — | — | — | — |
| | | random copolymer | — | — | — | — | — | — | 60 | — | — |
| | EPR | EPM (1) | 40 | 40 | 40 | 20 | 40 | — | 40 | — | — |
| | | EPM (2) | — | — | — | — | — | — | — | 40 | — |
| | | EPDM | — | — | — | — | — | — | — | — | 40 |
| | EAA (1) | | 17 | 5 | 1 | 5 | 5 | 5 | 5 | 5 | 5 |
| | EAA (2) | | — | — | — | — | — | — | — | — | — |
| flexural elasticity modulus (kg/cm$^2$) | | | 3,700 | 3,600 | 4,200 | 5,000 | 2,600 | 5,300 | 3,400 | 3,800 | 3,700 |
| Cross Cut Test | | | 92/100 | 100/100 | 100/100 | 100/100 | 100/100 | 100/100 | 100/100 | 100/100 | 100/100 |

| | | | \multicolumn{3}{c}{Example No.} | | | \multicolumn{5}{c}{Comparative Example No.} | | | | |
|---|---|---|---|---|---|---|---|---|---|---|---|
| | | | 29 | 30 | 31 | 1 | 2 | 3 | 4 | 5 |
| Composition (parts by weight) | PP | block copolymer (1) | 60 | 60 | 60 | 60 | 100 | — | 100 | — |
| | | block copolymer (2) | — | — | — | — | — | — | — | — |
| | | homopolymer | — | — | — | — | — | 100 | — | — |
| | | random copolymer | — | — | — | — | — | — | — | — |
| | EPR | EPM (1) | 40 | 40 | 40 | 40 | — | — | — | 100 |
| | | EPM (2) | — | — | — | — | — | — | — | — |
| | | EPDM | — | — | — | — | — | — | — | — |
| | EAA (1) | | — | — | — | — | — | 5 | — | 20 |
| | EAA (2) | | 10 | 3 | 1 | — | — | — | 50 | — |
| flexural elasticity modulus (kg/cm$^2$) | | | 3,600 | 3,600 | 3,900 | 4,300 | 10,700 | 12,200 | 5,200 | — |
| Cross Cut Test | | | 100/100 | 100/100 | 100/100 | 0/100 | 0/100 | 0/100 | 14/100 | — |

Coating of Resin Molding

A plate molded in the manner as described above was degreased, coated and evaluated. The obtained results are shown in Table 3.

In case of the composition of Comparative Example 11, the flexural elasticity modulus could not be measured and the evaluation by the cross cut test was impossible as in case of the compositions of Comparative Examples 5 and 8.

§ COATING:

Preliminary Treatment and Baking Treatment

A molded plate degreased with a vapor of trichloroethane for 30 seconds, and a paint was applied on the plate by using an air gun. After baking and drying, the coated plate was allowed to stand still at room temperature for 48 hours, and

TABLE 3

| | | Example No. | | | | | | | | | | |
|---|---|---|---|---|---|---|---|---|---|---|---|---|
| | | 32 | 33 | 34 | 35 | 36 | 37 | 38 | 39 | 40 | 41 | 42 |
| Composition (parts by weight) | | | | | | | | | | | | |
| PP | block copolymer (1) | 60 | 60 | 60 | 80 | 90 | 100 | — | 60 | 60 | 80 | 100 |
| | block copolymer (2) | — | — | — | — | — | — | 100 | — | — | — | — |
| | random copolymer | — | — | — | — | — | — | — | — | — | — | — |
| | homopolymer | — | — | — | — | — | — | — | — | — | — | — |
| EPR | EPM (1) | 40 | 40 | 40 | 20 | 10 | — | — | 40 | 40 | 20 | — |
| | EPM (2) | — | — | — | — | — | — | — | — | — | — | — |
| | EPDM | — | — | — | — | — | — | — | — | — | — | — |
| EHM (1) | | 2 | 5 | 10 | 5 | 5 | 5 | 5 | — | — | — | — |
| EHM (1) | | — | — | — | — | — | — | — | 5 | — | — | — |
| EHM (3) | | — | — | — | — | — | — | — | — | 5 | 5 | 5 |
| EHM (4) | | — | — | — | — | — | — | — | — | — | — | — |
| Cross cut test | | | | | | | | | | | | |
| flexural elasticity modulus (kg/cm$^2$) | | 3,500 | 3,400 | 3,200 | 5,600 | 6,800 | 9,000 | 4,900 | 3,300 | 3,300 | 5,800 | 9,100 |
| acrylic paint | | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ |
| urethane paint | | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ | $\frac{100}{100}$ |

| | | Example No. | | | | | | Comparative Example No. | | | | |
|---|---|---|---|---|---|---|---|---|---|---|---|---|
| | | 43 | 44 | 45 | 46 | 47 | 48 | 1 | 2 | 9 | 10 | 11 |
| Composition (parts by weight) | | | | | | | | | | | | |
| PP | block copolymer (1) | 60 | 60 | 60 | — | 60 | 60 | 60 | 100 | — | 60 | — |
| | block copolymer (2) | — | — | — | — | — | — | — | — | — | — | — |
| | random copolymer | — | — | — | 60 | — | — | — | — | — | — | — |
| | homopolymer | — | — | — | — | — | — | — | — | 100 | — | — |
| EPR | EPM (1) | 40 | 40 | 40 | 40 | — | — | 40 | — | — | 40 | 100 |
| | EPM (2) | — | — | — | — | 40 | — | — | — | — | — | — |
| | EPDM | — | — | — | — | — | 40 | — | — | — | — | — |
| EHM (1) | | — | — | — | 5 | 5 | 5 | — | — | 5 | — | 12 |
| EHM (1) | | — | — | — | — | — | — | — | — | — | — | — |
| EHM (3) | | — | — | — | — | — | — | — | — | — | — | — |
| EHM (4) | | 0.6 | 1.4 | 3 | — | — | — | — | — | — | 60 | — |
| Cross cut test | | | | | | | | | | | | |
| flexural elasticity modulus (kg/cm$^2$) | | 3,800 | 3,800 | 3,800 | 3,100 | 3,700 | 3,700 | 4,100 | 10,700 | 12,100 | 2,000 | — |
| acrylic paint | | $\frac{100}{100}$ | $\frac{100}{100}$ | $\frac{100}{100}$ | $\frac{100}{100}$ | $\frac{100}{100}$ | $\frac{100}{100}$ | $\frac{0}{100}$ | $\frac{0}{100}$ | $\frac{23}{100}$ | — | |
| urethane paint | | $\frac{98}{100}$ | $\frac{100}{100}$ | $\frac{100}{100}$ | $\frac{100}{100}$ | $\frac{100}{100}$ | $\frac{100}{100}$ | $\frac{0}{100}$ | $\frac{0}{100}$ | $\frac{0}{100}$ | $\frac{31}{100}$ | — |

Experiment II

Coating and evaluation were carried out according to the following procedures.

the coating properties were determined. In Example 57, the preliminary treatment was not performed before the coating operation.

Paint

A polyester-urethane paint (Flexthane #105 supplied by Nippon Bee Chemical) (in all the runs of Table 4) and an acryl-melamine paint (Primac #3001 supplied by Nippon Yushi) were used.

Coating Method

Each paint was prepared and spray-coated in a thickness of about 30 µm or about 70 µm by using an air spray gun. the coating was baked and dried at 120° C. for 60 minutes in case of the polyester-urethane paint or at 100° C. for 60 minutes in case of the acryl-melamine paint.

§ EVALUATION OF PAINT ADHESION:

Cross Cut Test

Eleven parallel cuts were drawn at intervals of 2 mm in both the longitudinal direction and the lateral direction on the surface of the test piece having a coating thickness of 30 µm by a single-edged razor blade to form 100 squares. A cellophane adhesive tape (JIS Z-1522) was sufficiently pressed to the cut surface. The cellophane tape was peeled inward at a stroke while maintaining an angle of about 30° to the coated surface. The state of the square-cut surface was examined, and the number of squares not peeled but left was recorded.

Warm Water Resistance Test

The test piece was immersed in warm water maintained at 40° C. for 240 hours and was then allowed to stand still in an atmosphere maintained at a temperature of 23° C. and a relative humidity of 50% for 24 hours. Then, the test piece was subjected to the above-mentioned cross cut test.

Peel Strength

Linear cuts were formed at an interval of 1 cm on the surface of the test piece having a coating thickness of 70 µm by a single-edged razor blade, and the strip portion of the coating was pulled at a speed of 200 mm/min (in the state where the coating was turned over by 180°) and the load at the peeling of the coating was measured.

§ EVALUATION OF MECHANICAL STRENGTH:

Izod Impact Strength

The notched Izod impact strength was measured according to JIS K-7110. The measurement atmosphere was maintained at −30° C.

§ EXPERIMENTATION:

EXAMPLES 49 THROUGH 56 AND COMPARATIVE EXAMPLES 12 THROUGH 15

Components (a), (b), (c) and (d) described below were kneaded and granulated at 200° C. at a mixing ratio shown in Table 4 by using a twin-screw kneading extruder (Model 2FCM supplied by Kobe Seiko). The formed pellet was molded at 220° C. into a test piece for evaluation of the physical properties and a sheet (120 mm×120 mm×3 mm in thickness) for evaluation of the coating properties by using a screw-in-line type injection molding machine (supplied by Meiki Seisakusho), and these properties were evaluated.

The obtained evaluation results are shown in Table 4.

Component (a-1):

A blend of a powder of a propylene/ethylene block copolymer having an entire ethylene content of 5% by weight and MFR of 8 g/10 min, which contained 16% by weight of a fraction being soluble in xylene at normal temperature and having an ethylene content of 32% by weight, with 0.1% by weight of tetrakis[methylene-3-(3',5'-di-t-butyl-4'-hydroxyphenyl)propionato]methane as the additive.

Component (a-2):

A blend of a powder of a propylene/ethylene block copolymer having an entire ethylene content of 3% by weight and MFR of 50 g/10 min and containing 7% by weight of a fraction being soluble in xylene at normal temperature and having an ethylene content of 43% by weight, with 0.1% by weight of the same additive as described above.

Component (a-3):

A blend of a powder of a propylene homopolymer having MFR of 9 g/10 min with 0.1% by weight of the same additive as described above.

Component (b-1):

An ethylene/propylene copolymer rubber having a propylene content of 25% by weight and a Mooney viscosity $ML_{1+4}$ (100° C.) of 18.

Component (b-2):

An ethylene/propylene copolymer rubber having a propylene content of 27% by weight and a Mooney viscosity $ML_{1+4}$ (100° C.) of 55.

Component (b-3):

A hydrogenated styrene/isoprene block copolymer (the hydrogenation degree was higher than 99%) having a styrene content of 35% by weight and MFR of 3 g/10 min (measured at 230° C. under a load of 2.16 kg).

Component (c-1):

A diene polymer having a molecular weight of about 2,900 and a hydroxyl value of about 88 (KOH mg/g).

This polymer was prepared by charging 100 g of 1,3-butadiene, 70 g of isopropyl alcohol and 10 g of 6.0% aqueous hydrogen peroxide in an autoclave having a capacity of 500 ml, carrying out polymerization at 90° C. for 5 hours in an argon atmosphere, removing the unreacted monomer after termination of the reaction and drying the formed polymer.

Component (c-2):

A hydrogenated diene polymer having an iodine value of 1.5 (g/100 g) and a hydroxyl value 87.8 (KOH mg/g).

This polymer was prepared by charging 50 g of component (c-1) described above, 50 g of cyclohexane and 5 g of a 5%-ruthenium-supported-on-carbon catalyst into an autoclave having a capacity of 200 ml, substituting the inner atmosphere with argon gas, feeding hydrogen gas so that the inner pressure was elevated to 50 kg/cm$^2$, elevating the temperature to 100° C., carrying out reaction for 10 hours while feeding hydrogen gas so that the total pressure was maintained at 50 kg/cm$^2$, removing hydrogen after termination of the reaction, removing the catalyst by filtration, precipitating the formed hydrogenation product in methanol, recovering the hydrogenation product by filtration and drying the hydrogenation product.

Component (c-3):

A hydrogenated butadiene polymer having an iodine value of 0.5 (g/100 g) and a hydroxyl value 48.9 (KOH mg/g).

Component (d-1):

Talc having such a particle size distribution that substantially all of the particles had a size smaller than 10 µm, the content of particles having a size smaller than 5 µm was higher than 99% and the content of particles having a size smaller than 1 µm was 30%, an average particle size of 1.7 µm, a specific surface area of 41,000 cm2/g and an average aspect ratio of 6.

Component (d-2):

Fibrous potassium titanate having an average diameter of 0.6 µm and an average aspect ratio of 35.

Component (e-1):

High-density polyethylene having MFR of 20 g/10 min and a density of 0.958 g/cm$^3$.

As shown in Table 4, coated moldings of the compositions of Examples 49 through 56 had practically sufficient coating strength and mechanical strength, even though the paint was only directly coated on the molded articles.

On the other hand, in the coated moldings of the compositions of Comparative Examples 12 through 15 had an insufficient coating strength or no coating strength at all.

when the compositions of Examples 49 through 56 were molded in test pieces, assumed as an automobile bumper, shown in FIG. 1, and these molded test pieces were coated in the same manner as described above, good results were obtained.

and the evaluation was carried out. The cut square peel strength at the cross cut test was 100/100 either at the initial stage or after the warm water resistance test. The peel strength was 1,390 g/cm.

EXAMPLE 58

To the resin composition of Example 52 were further added 0.2 part by weight of poly{[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]} and 0.1 part by weight of 2-(2'-hydroxy-3'-t-butyl-5'-methylphenyl)-5-chlorobenzotriazole per 100 parts by weight of the sum of components (a) through (e), and 0.6 part by weight of a blackish grey dry color composed mainly of carbon black and titanium oxide was further added per 100 parts by

TABLE 4

| | Composition | | | | | | | | | |
|---|---|---|---|---|---|---|---|---|---|---|
| | (a) Propylene/ethylene block copolymer | | (b) Elastomer | | (c) Diene polymer or hydrogenation product thereof | | (d) Filler | | (e) Ethylene polymer | |
| | kind | amount added (% by weight) | kind | amount added (% by weight) | kind | amount added (% by weight) | kind | amount added (% by weight) | kind | amount added (% by weight) |
| Example No. | | | | | | | | | | |
| 49 | a-2 | 72 | b-2 | 28 | c-2 | 1.1 | d-1 | 11 | — | — |
| 50 | a-2 | 61 | b-2 | 39 | c-2 | 1.1 | d-1 | 11 | — | — |
| 51 | a-2 | 72 | b-2 | 28 | c-2 | 2.3 | d-1 | 11 | — | — |
| 52 | a-2 | 71 | b-2 | 29 | c-2 | 2.4 | d-1 | 12 | e-1 | 3.4 |
| 53 | a-1 | 59 | b-1 | 41 | c-2 | 4.1 | d-1 | 31 | — | — |
| 54 | a-2 | 72 | b-2 | 28 | c-2 | 2.3 | d-2 | 11 | — | — |
| 55 | a-2 | 61 | b-3 | 39 | c-2 | 1.1 | d-1 | 11 | — | — |
| 56 | a-2 | 71 | b-2 | 29 | c-3 | 2.4 | d-1 | 12 | e-1 | 3.4 |
| Comparative Example No. | | | | | | | | | | |
| 12 | a-1 | 75 | b-1 | 25 | — | — | — | — | — | — |
| 13 | a-1 | 60 | b-1 | 40 | — | — | — | — | — | — |
| 14 | a-3 | 100 | — | — | c-2 | 2.0 | — | — | — | — |
| 15 | a-2 | 72 | b-2 | 28 | — | — | d-1 | 11 | — | — |

| | Evaluation Results | | | | |
|---|---|---|---|---|---|
| | Coating properties | | | Mechanical properties | |
| | Cross cut peeling | | | | Notched Izod |
| | Initial stage | After warm water resistance test | Peel strength (g/cm) | Flexural elasticity modulus (Kg/cm$^2$) | impact strength at −30° C. (kg · cm/cm$^2$) |
| Example No. | | | | | |
| 49 | 100/100 | 100/100 | 1,030 | 13,500 | 6.5 |
| 50 | 100/100 | 100/100 | 1,150 | 10,700 | 9.7 |
| 51 | 100/100 | 100/100 | 1,220 | 13,300 | 6.9 |
| 52 | 100/100 | 100/100 | 1,460 | 13,000 | 7.2 |
| 53 | 100/100 | 100/100 | 920 | 17,800 | 4.8 |
| 54 | 100/100 | 100/100 | 1,060 | 16,400 | 5.5 |
| 55 | 100/100 | 100/100 | 1,090 | 10,300 | 9.9 |
| 56 | 100/100 | 100/100 | 1,340 | 12,800 | 7.5 |
| Comparative Example No. | | | | | |
| 12 | 0/100 | — | — | 5,600 | 10.0 |
| 13 | 18/100 | — | — | 3,300 | N.B. |
| 14 | 0/100 | — | — | — | — |
| 15 | 0/100 | — | — | 13,700 | 6.3 |

EXAMPLE 57

A test piece of the composition of Example 52 was coated with the polyester paint without the preliminary treatment, weight of the sum of components (a) through (e) and the mixture was kneaded and granulated. The resulting resin composition was molded into a test piece having a thickness of 4.5 mm, assumed as an automotive bumper, shown in FIG. 1, by a screw-in-line type injection molding machine (Model Mitsubishi Natco supplied by Mitsubishi Jukogyo).

The molded test piece was coated, baked and dried in the same manner as described in Example 49 through 56 except that an acryl-melamine paint was used.

The cut square peel strength of the molded test piece at the cross cut test was 100/100 either at the initial stage or after the warm water resistance test, and the peel strength was 1,310 g/cm. The mechanical strength was substantially the same as that attained in Example 52 and practically sufficient. The weatherability was at a level satisfactory for an automotive part either before or after the coating operation.

Experiment III

Molding conditions for obtaining test pieces from resin compositions obtained in the examples and test methods for the evaluation were as described below.

§ MOLDING CONDITIONS:
Molding Machine
  Injection molding machine Model M40A-SJ supplied by Meiki Seisakusho
Molding Temperature
  230° C.
Molding Article
  Plate (65 mm×65 mm×2 mm) and test piece for three-point flexural elasticity modulus test (90 mm×10 mm×4 mm)
§ METHODS FOR EVALUATION OF PHYSICAL PROPERTIES:
Flexural Elasticity Modulus
  The measurement was conducted according to JIS K-7203.
MFR
  The measurement was conducted according to ASTM D-1238.
§ COATING:
Paint
  Coating was carried out by using a one-can acrylic paint or a one-can urethane paint.
  Coating Method
  Each paint was prepared and spray-coated in a thickness of about 40 μm for cross-cut test and about 100 μm for peel test by an air spray gun. Then, the coating was baked and dried at 100° C. for 60 minutes in case of the acrylic paint or at 120° C. for 60 minutes in case of the urethane paint.
§ EVALUATION OF PAINT ADHESION:
Cross Cut Test
  Eleven parallel cuts were drawn at intervals of 2 mm in both the longitudinal direction and the lateral direction on the surface of the test piece by a single-edged razor blade to form 100 squares. A cellophane adhesive tape (JIS Z-1522) was sufficiently pressed to the cut surface. The cellophane tape was peeled inward at a stroke while maintaining an angle of about 30° to the coated surface. The state of the square-cut surface was examined, and the number of squares not peeled but left was recorded.
Peel Test
  A test piece was processed at its upper half so that no paint would adhere thereto and a paint was applied to the lower half of the test piece to have a thickness of 100 μm, which was then baked. A strip of cellophane adhesive tape of 24 mm width was applied on the surface of the test piece under pressure, and two cut lines with 1 cm interval were applied from the bottom to the top of the test piece so that the cut line reached the surface of the test piece under the coat of paint. The strip of the cellophane adhesive tape at its upper end was plated by hand and the end of the strip was peeled by means of a pulling machine at an angle of 180° with a peeling speed of 50 mm/min. The load required for peeling was recorded. When the coat of paint was broken, the result was recorded as "broken".

§ EXPERIMENTATION:

EXAMPLES 59 THROUGH 78

Preparation of Resin Molding
  Components shown in Table 5 were melt-kneaded at 200° C. and pelletized by a twin-screw extruder.
  A plate test piece and a test piece for the three-point flexural elasticity modulus test were prepared by injection molding.
  The components shown in Table 5 were as described below.
Propylene Resins—Component (a)
  Block PP (1):
    A propylene/ethylene block copolymer having an ethylene content of 8.2% by weight, a flexural elasticity modulus of 10,000 kg/cm$^2$ and MFR of 33 g/10 min.
  Block PP (2):
    A propylene/ethylene block copolymer having an ethylene content of 13% by weight, a flexural elasticity modulus of 6,000 kg/cm$^2$ and MFR of 30 g/10 min.
  Random PP:
    A propylene/ethylene random copolymer having an ethylene content of 3.4% by weight, a flexural elasticity modulus of 10,500 kg/cm$^2$ and MFR of 15 g/10 min.
Copolymers of Ethylene with Hydroxyl Group-Containing Unsaturated Compound—Component (b) (MFR measured by the method of JIS-K 6760)
  EHM (1):
    An ethylene/2-hydroxyethyl methacrylate copolymer having a 2-hydroxyethyl methacrylate content of 10% by weight and an MFR of 7 g/10 min, which was obtained according to the high-pressure radical polymerization process.
  EHM (2):
    An ethylene/2-hydroxyethyl methacrylate/methyl acrylate copolymer having a 2-hydroxyethyl methacrylate content of 10% by weight, a methyl acrylate content of 10% by weight and an MFR of 13 g/10 min, which was obtained according to the high-pressure radical polymerization process.
  EHM (3):
    An ethylene/2-hydroxyethyl methacrylate/methyl acrylate having a 2-hydroxyethyl methacrylate content of 10% by weight, a methyl acrylate content of 10% by weight and an MFR of 100 g/10 min, which was obtained according to the high-pressure radical polymerization process.
Copolymers of Ethylene with Unsaturated Carboxylic Acid or Anhydride Thereof—Component (c) (MFR measured by the method of JIS-K 6760)
  EAA (1):
    An ethylene/acrylic acid copolymer having an acrylic acid content of 13% by weight and MFR of 7 g/10 min, which was obtained by the high-pressure radical polymerization process.
  EAA (2):
    An ethylene/acrylic acid copolymer having an acrylic acid content of 20% by weight and MFR of 300 g/10 min, which was obtained by the high-pressure radical polymerization process.
Olefinic Elastomers—Component (d)
  EPM (1):

An ethylene/propylene copolymer rubber having a Mooney viscosity $ML_{1+4}$ (100° C.) of 70 and a specific gravity of 0.86.

EPM (2):

An ethylene/propylene copolymer rubber having a Mooney viscosity $ML_{1+4}$ (100° C.) of 24 and a specific gravity of 0.86.

EPDM:

An ethylene/propylene/ethylidenenorbornene copolymer having a Mooney viscosity $ML_{1+4}$ (100° C.) of 47 and a specific gravity of 0.86.

SEBS:

A hydrogenated product of a styrene/butadiene block copolymer rubber having a number average molecular weight of 70,000 and specific gravity of 0.91.

Auxiliaries—Component (e)

Phenolic antioxidant:

Tetrakis[methylene-3-(3,5-di-t-butyl-4-hydroxyphenyl) propionate]methane under tradename of IRGANOX by Ciba-Geigy.

HALS which is a hindered amine photostabilizer:

Bis-2,2,6,6-tetramethyl-4-pyperidinyl sebacate under a tradename of Sanol 770 by Sankyo, Japan.

Lubricant:

Oleic amide under a tradename of Newtron by Nippon Seika, Japan.

Coating of a resin molding

The plate prepared as hereinabove described was subjected to degreasing with trichloroethane vapor for 30 minutes, and a paint was applied thereon by a spray gun. The coat was baked and left standing at room temperature for 48 hours. Cross-cut test was then carried out on the baked coat.

§ RESULT OBTAINED:

The results obtained are set forth in Table 5.

TABLE 5

| | Example No. | | | | | | | | | | |
|---|---|---|---|---|---|---|---|---|---|---|---|
| | 59 | 60 | 61 | 62 | 63 | 64 | 65 | 66 | 67 | 68 | 69 |
| Composition (parts by weight) | | | | | | | | | | | |
| Comp. (a) Propylene polymer | | | | | | | | | | | |
| block PP (1) | 100 | 100 | 100 | 100 | 100 | 100 | 100 | 100 | — | — | — |
| block PP (2) | — | — | — | — | — | — | — | — | 100 | 100 | — |
| random PP | — | — | — | — | — | — | — | — | — | — | 100 |
| Comp. (b) | | | | | | | | | | | |
| EHM (1) | 3 | 8 | 16 | 8 | 8 | 6.9 | 6 | 5.3 | 8 | 5 | 8 |
| EHM (2) | — | — | — | — | — | — | — | — | — | — | — |
| EHM (3) | — | — | — | — | — | — | — | — | — | — | — |
| Comp. (c) | | | | | | | | | | | |
| EAA (1) | 1.7 | 1.7 | 1.7 | 0.8 | 5 | 1.5 | 1.3 | 1.1 | 1.7 | 1 | 1.7 |
| EAA (2) | — | — | — | — | — | — | — | — | — | — | — |
| Comp. (d) Elastomer | | | | | | | | | | | |
| EPM (1) | 67 | 67 | 67 | 67 | 67 | 43 | 25 | 11 | 67 | — | 67 |
| EPM (2) | — | — | — | — | — | — | — | — | — | — | — |
| EPDM | | | | | | | | | | | |
| SEBS | | | | | | | | | | | |
| Comp. (e) Aux. | | | | | | | | | | | |
| IRGANOX | — | — | — | — | — | — | — | — | — | — | — |
| HALS | — | — | — | — | — | — | — | — | — | — | — |
| Lubricant | — | — | — | — | — | — | — | — | — | — | — |
| Flexural elasticity modulus (kg/cm$^2$) | 3500 | 3400 | 3200 | 3400 | 3200 | 4600 | 5600 | 6800 | 2500 | 5300 | 3500 |
| Coatability | | | | | | | | | | | |
| Cross cut test | | | | | | | | | | | |
| acrylic paint | 100/100 | 100/100 | 100/100 | 100/100 | 100/100 | 100/100 | 100/100 | 100/100 | 100/100 | 100/100 | 100/100 |
| urethane paint | 100/100 | 100/100 | 100/100 | 100/100 | 100/100 | 100/100 | 100/100 | 100/100 | 100/100 | 100/100 | 100/100 |
| Peel test | | | | | | | | | | | |
| acrylic paint | — | 1460 (broken) | — | 1400 (broken) | — | — | — | — | — | — | — |
| urethane paint | — | 1520 | — | 1500 | — | — | — | — | — | — | — |

TABLE 5-continued

| | Example No. | | | | | | | | |
|---|---|---|---|---|---|---|---|---|---|
| | 70 | 71 | 72 | 73 | 74 | 75 | 76 | 77 | 78 |
| Composition (parts by weight) | | | | | | | | | |
| Comp. (a) Propylene polymer | | | | | | | | | |
| block PP (1) | 100 | 100 | 100 | 100 | 100 | 100 | 100 | 100 | 100 |
| block PP (2) | — | — | — | — | — | — | — | — | — |
| random PP | — | — | — | — | — | — | — | — | — |
| Comp. (b) | | | | | | | | | |
| EHM (1) | — | — | 8 | 8 | 8 | 8 | 8 | 8 | 8 |
| EHM (2) | 8 | — | — | — | — | — | — | — | — |
| EHM (3) | — | 8 | — | — | — | — | — | — | — |
| Comp. (c) | | | | | | | | | |
| EAA (1) | 1.7 | 1.7 | — | 1.7 | 1.7 | 1.7 | 1.7 | 1.7 | 1.7 |
| EAA (2) | — | — | 1.7 | — | — | — | — | — | — |
| Comp. (d) Elastomer | | | | | | | | | |
| EPM (1) | 67 | 67 | 67 | — | — | — | 67 | 67 | 67 |
| EPM (2) | — | — | — | 67 | — | — | — | — | — |
| EPDM | — | — | — | — | 67 | — | — | — | — |
| SEBS | — | — | — | — | — | 67 | — | — | — |
| Comp. (e) Aux. | | | | | | | | | |
| IRGANOX | — | — | — | — | — | — | 0.3 | — | — |
| HALS | — | — | — | — | — | — | — | 0.3 | — |
| Lubricant | — | — | — | — | — | — | — | — | 0.3 |
| Flexural elasticity modulus (kg/cm$^2$) | 3400 | 3300 | 3400 | 3700 | 3600 | 3700 | 3400 | 3400 | 3400 |
| Coatability | | | | | | | | | |
| Cross cut test | | | | | | | | | |
| acrylic paint | 100/100 | 100/100 | 100/100 | 100/100 | 100/100 | 100/100 | 100/100 | 100/100 | 100/100 |
| urethane paint | 100/100 | 100/100 | 100/100 | 100/100 | 100/100 | 100/100 | 100/100 | 100/100 | 100/100 |
| Peel test | | | | | | | | | |
| acrylic paint | — | — | — | — | — | — | 1500 (broken) | 1400 (broken) | 1620 (broken) |
| urethane paint | — | — | — | — | — | — | 1400 | 1380 | 1440 |

Experiment IV

Molding conditions for obtaining test pieces from resin compositions obtained in the examples and test methods for the evaluation were as described below.

§ MOLDING CONDITIONS:

Molding Machine

Injection molding machine Model M40A-SJ supplied by Meiki Seisakusho

Molding Temperature

230° C.

Molding Article

Plate (65 mm×65 mm×2 mm) and test piece for three-point flexural elasticity modulus test (90 mm×10 mm×4 mm)

§ METHODS FOR EVALUATION OF PHYSICAL PROPERTIES:

Flexural Elasticity Modulus

The measurement was conducted according to JIS K-7203.

MFR

The measurement was conducted according to ASTM D-1238.

§ COATING:

Paint

Coating was carried out by using a one-can acrylic paint or a one-can urethane paint.

Coating Method

Each paint was prepared and spray-coated in a thickness of about 40 μm for cross-cut test and about 100 μm for peel test by an air spray gun. Then, the coating was baked and dried at 100° C. for 60 minutes in case of the acrylic paint or at 120° C. for 60 minutes in case of the urethane paint.

§ EVALUATION OF PAINT ADHESION:

Cross Cut Test

Eleven parallel cuts were drawn at intervals of 2 mm in both the longitudinal direction and the lateral direction on the surface of the test piece by a single-edged razor blade to form 100 squares. A cellophane adhesive tape (JIS Z-1522) was sufficiently pressed to the cut surface. The cellophane tape was peeled inward at a stroke while maintaining an angle of about 30° to the coated surface. The state of the square-cut surface was examined, and the number of squares not peeled but left was recorded.

Peel Test

A test piece was processed at its upper half so that no paint would adhere thereto and a paint was applied to the lower half of the test piece to have a thickness of 100 μm, which was then baked. A strip of cellophane adhesive tape of 24 mm width was applied on the surface of the test piece under pressure, and two cut lines with 1 cm interval were applied from the bottom to the top of the test piece so that the cut line reached the surface of the test piece under the coat of paint. The strip of the cellophane adhesive tape at its upper end was plated by hand and the end of the strip was peeled by means of a pulling machine at an angle of 180° with a peeling speed of 50 mm/min. The load required for peeling was recorded. When the coat of paint was broken, the result was recorded as "broken".

§ EXPERIMENTATION:

EXAMPLES 79 THROUGH 101

Preparation of Resin Molding

Components shown in Table 6 were melt-kneaded at 200° C. and pelletized by a twin-screw extruder.

A plate test piece and a test piece for the three-point flexural elasticity modulus test were prepared by injection molding.

The components shown in Table 6 were as described below.

Propylene Resins—Component (a)

Block PP (1):

A propylene/ethylene block copolymer having an ethylene content of 8.2% by weight, a flexural elasticity modulus of 10,000 kg/cm$^2$ and MFR of 33 g/10 min.

Block PP (2):

A propylene/ethylene block copolymer having an ethylene content of 13% by weight, a flexural elasticity modulus of 6,000 kg/cm$^2$ and MFR of 30 g/10 min.

Random PP:

A propylene/ethylene random copolymer having an ethylene content of 3.4% by weight, a flexural elasticity modulus of 10,500 kg/cm$^2$ and MFR of 15 g/10 min.

Hydroxyl Group-Containing Diene Polymers and Hydrogenation Products Thereof—Component (bb)

Diene Polymer

The diene polymer having a terminal hydroxyl group, which was obtained in the manner described below.

Hydrogenated Diene Polymer (1):

Diene Polymer (OH)(H)(1):

The hydrogenation product of the above-mentioned terminal hydroxyl group-containing diene polymer, which was obtained in the manner described below.

Diene Polymer (OH)(H)(2):

A hydrogenated butadiene polymer having an iodine value of 0.5 (g/100 g) and a hydroxyl value of 46.9 (KOH mg/g).

Synthesis of Diene Polymer Having Terminal Hydroxyl Group

In an autoclave having a capacity of 500 ml, 100 g of 1,3-butadiene was polymerized by using 70 g of isopropyl alcohol and 10 g of 60% aqueous hydrogen peroxide in an argon atmosphere at 90° C. for 5 hours. After termination of the reaction, the unreacted monomer was removed, and the formed diene polymer was dried.

The molecular weight of the obtained polymer was about 2,900 and the hydroxyl value was about 88 (KOH mg/g).

Synthesis of Hydrogenation Product of Diene Polymer Having Terminal Hydroxyl Group An autoclave having a capacity of 200 ml was charged with 50 g of the obtained diene polymer having a terminal hydroxyl group, 50 g of cyclohexane and 5 g of a 5%-ruthenium-supported-on-carbon catalyst, and the inner atmosphere was substituted with argon gas and hydrogen gas was introduced into the autoclave until the pressure was elevated to 50 kg/cm$^2$. Then, the temperature was elevated to 100° C., and reaction was carried out for 10 hours while feeding hydrogen gas so that the total pressure was maintained at 50 kg/cm$^2$. After termination of the reaction, hydrogen was removed, and the catalyst was removed by filtration. The formed hydrogenation product was precipitated in methanol, and the precipitate was recovered by filtration and dried to obtain the intended product. The iodine value of the obtained hydrogenated diene polymer was 1.5 (g/100 g), and the hydroxyl value was 87.8 (KOH mg/g).

Copolymers of Ethylene with Unsaturated Carboxylic Acid or Anhydride Thereof—Component (c) (MFR measured by the method of JIS-K 6760)

EAA (1):

An ethylene/acrylic acid copolymer having an acrylic acid content of 13% by weight and MFR of 7 g/10 min, which was obtained by the high-pressure radical polymerization process.

EAA (2):

An ethylene/acrylic acid copolymer having an acrylic acid content of 20% by weight and MFR of 300 g/10 min, which was obtained by the high-pressure radical polymerization process.

Olefinic Elastomers—Component (d)

EPM (1):

An ethylene/propylene copolymer rubber having a Mooney viscosity ML$_{1+4}$ (100° C.) of 70 and a specific gravity of 0.86.

EPM (2):

An ethylene/propylene copolymer rubber having a Mooney viscosity ML$_{1+4}$ (100° C.) of 24 and a specific gravity of 0.86.

EPDM:

An ethylene/propylene/ethylidenenorbornene copolymer having a Mooney viscosity ML$_{1+4}$ (100° C.) of 47 and a specific gravity of 0.86.

SEBS:

A hydrogenated product of a styrene/butadiene block copolymer rubber having a number average molecular weight of 70,000 and specific gravity of 0.91.

Auxiliaries—Component (e)

Phenolic antioxidant:

Tetrakis[methylene-3-(3,5-di-t-butyl-4-hydroxyphenyl) propionate]methane under tradename of IRGANOX by Ciba-Geigy.

HALS which is a hindered amine photostabilizer:

Bis-2,2,6,6-tetramethyl-4-pyperidinyl sebacate under a tradename of Sanol 770 by Sankyo, Japan.

Lubricant:

Oleic amide under a tradename of Newtron by Nippon Seika, Japan.

Plasticizer:

A paraffin oil of a number-average molecular weight of 750 and a specific gravity of 0.88.

Coating of a resin molding

The plate prepared as hereinabove described was subjected to degreasing with trichloroethane vapor for 30 minutes, and a paint was applied thereon by a spray gun. The coat was baked and left standing at room temperature for 48 hours. Cross-cut test was then carried out on the baked coat.

§ RESULT OBTAINED:

The results obtained are set forth in Table 6.

TABLE 6

| | Example No. | | | | | | | | | | | |
|---|---|---|---|---|---|---|---|---|---|---|---|---|
| | 79 | 80 | 81 | 82 | 83 | 84 | 85 | 86 | 87 | 88 | 89 | 90 |
| Composition (parts by weight) | | | | | | | | | | | | |
| Comp. (a) Propylene polymer | | | | | | | | | | | | |
| block PP (1) | 100 | 100 | 100 | 100 | 100 | 100 | 100 | 100 | 100 | 100 | 100 | — |
| block PP (2) | — | — | — | — | — | — | — | — | — | — | — | 100 |
| random PP | — | — | — | — | — | — | — | — | — | — | — | — |
| Comp. (bb) | | | | | | | | | | | | |
| diene polymer (OH) | 12 | 5 | — | — | — | — | — | — | — | — | — | — |
| diene polymer (OH) (H) (1) | — | — | 12 | 5 | 1.7 | 0.8 | 0.2 | 1.7 | 1.7 | 1.2 | 1 | 1 |
| diene polymer (OH) (H) (2) | — | — | — | — | — | — | — | — | — | — | — | — |
| Comp. (c) | | | | | | | | | | | | |
| EAA (1) | 1.7 | 1.7 | 1.7 | 1.7 | 1.7 | 1.7 | 0.8 | 0.8 | 5 | 1.2 | 1 | 1 |
| EAA (2) | — | — | — | — | — | — | — | — | — | — | — | — |
| Comp. (d) Elastomer | | | | | | | | | | | | |
| EPM (1) | 67 | 67 | 67 | 67 | 67 | 67 | 67 | 67 | 67 | 25 | 11 | — |
| EPM (2) | — | — | — | — | — | — | — | — | — | — | — | — |
| EPDM | — | — | — | — | — | — | — | — | — | — | — | — |
| SEBS | — | — | — | — | — | — | — | — | — | — | — | — |
| Comp. (e) Aux. | | | | | | | | | | | | |
| IRGANOX | — | — | — | — | — | — | — | — | — | — | — | — |
| HALS | — | — | — | — | — | — | — | — | — | — | — | — |
| Lubricant | — | — | — | — | — | — | — | — | — | — | — | — |
| Flexural elasticity modulus (kg/cm$^2$) | 2700 | 3500 | 2900 | 3600 | 3900 | 4000 | 4400 | 3900 | 3700 | 5200 | 7200 | 5200 |
| Coatability | | | | | | | | | | | | |
| Cross cut test | | | | | | | | | | | | |
| acrylic paint | 92/100 | 100/100 | 100/100 | 100/100 | 100/100 | 100/100 | 100/100 | 100/100 | 100/100 | 100/100 | 100/100 | 100/100 |
| urethane paint | 100/100 | 100/100 | 100/100 | 100/100 | 100/100 | 100/100 | 100/100 | 100/100 | 100/100 | 100/100 | 100/100 | 100/100 |
| Peel test | | | | | | | | | | | | |
| acrylic paint | — | — | — | 1420 (broken) | 1300 (broken) | — | — | — | — | 920 | — | — |
| urethane paint | — | — | — | 1280 (broken) | 1550 (broken) | — | — | — | — | 1060 | — | — |

| | Example No. | | | | | | | | | | |
|---|---|---|---|---|---|---|---|---|---|---|---|
| | 91 | 92 | 93 | 94 | 95 | 96 | 97 | 98 | 99 | 100 | 101 |
| Composition (parts by weight) | | | | | | | | | | | |
| Comp. (a) Propylene polymer | | | | | | | | | | | |
| block PP (1) | — | — | 100 | 100 | 100 | 100 | 100 | 100 | 100 | 100 | 100 |
| block PP (2) | 100 | — | — | — | — | — | — | — | — | — | — |
| random PP | — | 100 | — | — | — | — | — | — | — | — | — |
| Comp. (bb) | | | | | | | | | | | |
| diene polymer (OH) | — | — | — | — | — | — | — | — | — | — | — |
| diene polymer (OH) (H) (1) | 1.7 | 1.7 | — | 1.7 | 1.7 | 1.7 | 1.7 | 1.7 | 1.7 | 1.7 | 1.7 |
| diene polymer (OH) (H) (2) | — | — | 3.3 | — | — | — | — | — | — | — | — |

TABLE 6-continued

| Comp. (c) | | | | | | | | | | | |
|---|---|---|---|---|---|---|---|---|---|---|---|
| EAA (1) | 1.7 | 1.7 | 1.7 | — | 1.7 | 1.7 | 1.7 | 1.7 | 1.7 | 1.7 | 1.7 |
| EAA (2) | — | — | — | 1.7 | — | — | — | — | — | — | — |
| Comp. (d) Elastomer | | | | | | | | | | | |
| EPM (1) | 67 | 67 | 67 | 67 | — | — | — | — | 67 | 67 | 67 |
| EPM (2) | — | — | — | — | 67 | — | — | — | — | — | — |
| EPDM | — | — | — | — | — | 67 | — | — | — | — | — |
| SEBS | — | — | — | — | — | — | 67 | 100 | — | — | — |
| Comp. (e) Aux. | | | | | | | | | | | |
| IRGANOX | — | — | — | — | — | — | — | — | 0.3 | — | — |
| HALS | — | — | — | — | — | — | — | — | — | 0.3 | — |
| Lubricant | — | — | — | — | — | — | — | 20* | — | — | 0.3* |
| Flexural elasticity modulus (kg/cm$^2$) | 2500 | 3400 | 4000 | 4000 | 4200 | 4300 | 3700 | 2500 | 3900 | 4000 | 3900 |
| Coatability | | | | | | | | | | | |
| Cross cut test | | | | | | | | | | | |
| acrylic paint | 100/100 | 100/100 | 100/100 | 100/100 | 100/100 | 100/100 | 100/100 | 100/100 | 100/100 | 100/100 | 100/100 |
| urethane paint | 100/100 | 100/100 | 100/100 | 100/100 | 100/100 | 100/100 | 100/100 | 100/100 | 100/100 | 100/100 | 100/100 |
| Peel test | | | | | | | | | | | |
| acrylic paint | — | — | — | — | — | — | — | — | 1220 (broken) | 1100 (broken) | 1300 (broken) |
| urethane paint | — | — | — | — | — | — | — | — | 1400 | 1380 | 1440 |

*Not lubricant but plasticizer which is paraffin oil

Experiment V

§ COMPONENTS USED:

Block PP (1), which is the same block copolymer used in Experiment I as block copolymer (1).

EPM (1), which is the same as EPM (1) used in Experiment I.

Diene polymer (OH)(H)(2), which is the same hydrogenated butadiene polymer having a terminal hydroxyl group used in Experiment I as hydrogenation product of diene polymer (2).

Filler, which is talc of granulometric properties such that the size of particles is substantially no larger than 10 μm, the content of particles of no larger than 5 μm is no smaller than 99% and the content of particles of no larger than 1 μm is 30%, average particle size is 1.7 μm, a specific surface of 41000 cm$^2$/g, and an average aspect ratio of 6.

§ MOLDING CONDITIONS:

The same as those used in Experiment I in a molding machine, a molding temperature, and a molding article.

§ PRIMER:

A commercially available primer for a resin under a tradename of "Primac #1500F" manufactured by Nippon Yushi K.K., Japan.

§ PAINT:

An urethane paint available on the market under a tradename of "Flexthane #105, manufactured by Nippon Bee Chemical, Japan.

Acrylic paint available on the market under a tradename "Primac #3001, manufactured by Nippon Yushi K.K., Japan.

§ COATING CONDITIONS:

A primer was applied on the test piece by a spray gun and the coat formed was left standing at room temperature for 30 minutes. A paint was then applied onto the primer surface to form a paint coat of ca. 40 μm thickness, which was then baked at 120° C. for 60 minutes for the urethane paint or at 100° C. for 60 minutes for the acrylic paint.

After the baking, test pieces were left standing at room temperature for 48 hours, which were then subjected to the cross-cut test.

§ EVALUATION OF PAINT ADHESION:

The same as those used in Experiment I in the three-point flexural elasticity modulus and the cross-cut test.

§ RESULT OBTAINED:

The results obtained are set forth in Table 7.

TABLE 7

| | Component | Example 102 | Example 103 | Example 104 |
|---|---|---|---|---|
| Composition (% by wt.) | Block PP (1) | 57 | 67 | 57 |
| | EPM (1) | 40 | 30 | 30 |
| | Diene polymer (OH) (H) (2) | 3 | 3 | 3 |
| | Filler | | | 10 |
| Evaluation | Three-point, initial flexural elasticity modulus (kg/cm$^2$) | 3800 | 4700 | 6100 |
| | Cross-cut test Urethane paint | 100/100 | 100/100 | 100/100 |
| | Acrylic paint | 100/100 | 100/100 | 100/100 |

We claim:

1. An automotive part comprising a molding composed of a resin composition, said resin composition comprising (a) 40 to 80 parts by weight of a propylene/ethylene block copolymer having an ethylene content of 3 to 25% by weight and containing 3 to 35% by weight of a fraction soluble in xylene at normal temperature, which has an ethylene content of 20 to 70% by weight, a melt flow rate of the entire copolymer being 5 to 120 g/10 min, (b) 60 to 20 parts by weight of at least one elastomer selected from the group consisting of ethylene copolymer elastomers, hydrogenated styrene/butadiene block copolymers and hydrogenated styrene/isoprene block copolymers, (c) 0.01 to 10 parts by weight per 100 parts by weight of the sum of components (a) and (b), of a hydrogenated product of a diene polymer having a terminal hydroxyl group and an iodine value of from about 0 to about 5 g/100 g, and (d) 1 to 40 parts by weight per 100 parts by weight of the sum of components (a) and (b), of at least one filler selected from the group consisting of (i) a plate filler having particles of a specific surface area of at least 30,000 cm$^2$/gm, and a size smaller than 15μm, and an average aspect ratio of at least 4 and (ii) a fibrous filler having fibers of an average diameter smaller than 2 μm and an average aspect ratio of at least 5.

2. An automotive part as set forth in claim 1, wherein the contents of components (c) and (d) are 0.1 to 5 parts and 1 to 25 parts by weight, respectively, per 100 parts by weight of the sum of components (a) and (b).

3. An automotive part as claimed in claim 1, wherein the diene polymer is a butadiene polymer.

4. An automotive as claimed in claim 1, wherein the diene polymer is a 1,3-polybutadiene.

5. An automotive part as claimed in claim 1, wherein the plate filler particles have a specific surface area of at least 35,000 cm$^2$/g, and wherein at least 95% of the plate filler particles have a size smaller than 10 μm, at least 80% of the particles have a size smaller than 5 μm and 5 to 50 % of the particles have size smaller than 1 μm.

* * * * *